United States Patent
Perego et al.

(10) Patent No.: US 11,254,810 B2
(45) Date of Patent: Feb. 22, 2022

(54) POLYMER COMPOSITION COMPRISING A DIELECTRIC LIQUID OF IMPROVED POLARITY

(71) Applicant: NEXANS, Courbevoie (FR)

(72) Inventors: Gabriele Perego, Milan (IT); Christelle Mazel, Ruy (FR); Matthias Meyer, Luebeck (DE); Dimitri Charrier, Ecully (FR); Xavier Festaz, Villieu-Loyes-Mollon (FR); Anthony Combessis, Marseilles (FR)

(73) Assignee: NEXANS, Courbevoie (FR)

( * ) Notice: Subject to any disclaimer, the term of this patent is extended or adjusted under 35 U.S.C. 154(b) by 5 days.

(21) Appl. No.: 16/061,821

(22) PCT Filed: Dec. 15, 2016

(86) PCT No.: PCT/FR2016/053478
§ 371 (c)(1),
(2) Date: Jun. 13, 2018

(87) PCT Pub. No.: WO2017/103509
PCT Pub. Date: Jun. 22, 2017

(65) Prior Publication Data
US 2018/0362749 A1 Dec. 20, 2018

(30) Foreign Application Priority Data
Dec. 18, 2015 (FR) ...................... 15 62782

(51) Int. Cl.
*C08L 23/00* (2006.01)
*C08L 23/14* (2006.01)
(Continued)

(52) U.S. Cl.
CPC ............... *C08L 23/14* (2013.01); *C08K 5/07* (2013.01); *C08L 23/0815* (2013.01);
(Continued)

(58) Field of Classification Search
CPC ........... H01B 3/22; H01B 3/44; C08F 210/06; C08L 23/14; C08K 23/0815; C08K 5/07
See application file for complete search history.

(56) References Cited

U.S. PATENT DOCUMENTS 7,744,803 B2 * 6/2010 Jackson ................ C08L 23/16
264/477
2006/0076155 A1 4/2006 Belli et al.
(Continued)

FOREIGN PATENT DOCUMENTS

| CL | 200001898 | 4/2001 |
| CL | 200402542 | 10/2005 |

(Continued)

OTHER PUBLICATIONS

International Search Report dated Feb. 9, 2017.
(Continued)

*Primary Examiner* — Necholus Ogden, Jr.
(74) *Attorney, Agent, or Firm* — Sofer & Haroun, LLP

(57) ABSTRACT

A polymer composition has at least one thermoplastic polymer material and a dielectric liquid of improved polarity, to a process for preparing said polymer composition, to a cable comprising at least one electrically insulating layer obtained from the polymer composition, and to a process for preparing the cable.

16 Claims, 2 Drawing Sheets

(51) Int. Cl.
    *C08K 5/07*          (2006.01)
    *C08L 23/10*        (2006.01)
    *C08L 23/08*        (2006.01)
    *C08L 91/00*        (2006.01)
    *H01B 3/22*         (2006.01)

(52) U.S. Cl.
    CPC .............. *C08L 23/10* (2013.01); *C08L 91/00* (2013.01); *H01B 3/22* (2013.01); *C08L 2203/202* (2013.01); *C08L 2207/02* (2013.01); *C08L 2207/04* (2013.01); *C08L 2666/34* (2013.01)

(56) References Cited

U.S. PATENT DOCUMENTS

| | | | | |
|---|---|---|---|---|
| 2012/0261163 A1* | 10/2012 | Tai | ............... | C08L 23/10 |
| | | | | 174/136 |
| 2013/0161059 A1* | 6/2013 | Steffl | ............... | H01B 9/027 |
| | | | | 174/105 SC |
| 2013/0233604 A1* | 9/2013 | Perego | ............... | C08L 23/12 |
| | | | | 174/26 R |
| 2015/0228376 A1* | 8/2015 | Ranganathan | ............... | B29C 48/15 |
| | | | | 428/391 |
| 2015/0376369 A1* | 12/2015 | Ranganathan | ............... | C08K 3/346 |
| | | | | 428/384 |
| 2016/0333173 A1* | 11/2016 | Jousset | ............... | B32B 27/22 |

FOREIGN PATENT DOCUMENTS

| | | |
|---|---|---|
| CN | 101418102 | 4/2009 |
| CN | 102086286 | 6/2011 |
| CN | 103102592 | 5/2013 |
| CN | 104448543 | 3/2015 |
| CN | 104987605 | 10/2015 |
| WO | 2012069864 | 5/2012 |

OTHER PUBLICATIONS

Chilean Office Action dated Aug. 6, 2019.
Chinese Office Action dated Apr. 23, 2020.
Chilean Office Action dated Feb. 10, 2020.

\* cited by examiner

A)

B)

POLYMER COMPOSITION COMPRISING A DIELECTRIC LIQUID OF IMPROVED POLARITY

RELATED APPLICATIONS

This application is a National Phase Application of PCT/FR2016/053478 filed on Dec. 15, 2016, which in turn claims the benefit of French Patent Application No. 15 62782 filed on Dec. 18, 2015.

BACKGROUND

Field of the Invention

The invention relates to a polymer composition comprising at least one thermoplastic polymer material and a dielectric liquid of improved polarity, to a process for preparing said polymer composition, to a cable comprising at least one electrically insulating layer obtained from said polymer composition, and to a process for preparing said cable.

The invention applies typically, but not exclusively, to electric cables intended for power transmission, especially medium-voltage power cables (especially from 6 to 45-60 kV) or high-voltage power cables (especially above 60 kV, and which may be up to 400 kV), whether for DC or AC current, in the fields of overhead, submarine or terrestrial electricity transmission, or alternatively in the field of aeronautics.

Description of Related Art

A medium-voltage or high-voltage power transmission cable generally comprises, from the interior to the exterior:
- an elongated electrically conducting element, especially made of copper or aluminium;
- a semi-conducting internal layer surrounding said elongated electrically conducting element;
- an electrically insulating layer surrounding said semi-conducting internal layer;
- a semi-conducting external layer surrounding said insulating layer; and
- optionally, an electrically insulating protective sheath surrounding said semi-conducting external layer.

In particular, the electrically insulating layer may be a polymer layer based on a crosslinked polyolefin such as a crosslinked polyethylene (XLPE) or an ethylene-propylene or ethylene-propylene-diene crosslinked elastomer. The crosslinking is generally performed during the step of extrusion of the polymer composition around the elongated electrically conducting element. The use of a crosslinked polyolefin provides a layer which has satisfactory electrical and mechanical properties and gives a cable which can function at a temperature above 70° C., or even equal to 90° C. However, several problems are encountered. Firstly, crosslinked materials cannot be recycled. Secondly, crosslinking (vulcanization) to produce a homogeneous layer requires specific reaction conditions (e.g. in terms of duration and temperature) which reduce the rate of manufacture of the cable and increase its production cost. Finally, crosslinking may occasionally start prematurely in the extruder and/or the extruder head, leading to degradation of the quality of the layer obtained, especially of its dielectric properties.

Alternatives have thus been proposed, such as a thermoplastic layer of low-density polyethylene (LDPE) or of high-density polyethylene (HDPE). However, a cable comprising such an electrically insulating layer cannot function at a temperature above about 70° C. for an LDPE thermoplastic layer and above 80° C. for an HDPE thermoplastic layer, leading to a limitation of the power that can be transmitted in said cable and of the manufacturing methods.

It is also known practice to manufacture an electrically insulating layer composed of several strips of paper or of a paper-polypropylene composite impregnated with a large amount of dielectric liquid (e.g. cable containing paper impregnated with oil). The dielectric liquid completely fills the empty spaces present in the layer and prevents partial discharges and damage to the insulation of the cable. However, this type of electrically insulating layer is very complex and expensive to manufacture.

The choice of the dielectric liquid will depend on the envisaged application (i.e. the type of electrical equipment) and on its compatibility with the solid insulator that it is intended to impregnate and/or with which it forms an intimate mixture. Among the conventional dielectric liquids, mention may be made of mineral oils (e.g. naphthenic oils, paraffinic oils, aromatic oils or polyaromatic oils), vegetable oils (e.g. soybean oil, linseed oil, rapeseed oil, corn oil or castor oil) or synthetic oils such as aromatic hydrocarbons (alkylbenzenes, alkylnaphthalenes, alkylbiphenyls, alkyldiarylethylenes, etc.), silicone oils, ether oxides, organic esters or aliphatic hydrocarbons.

In particular, international patent application WO 02/03398 A1 describes a cable comprising at least one electrical conductor and at least one extruded electrically insulating layer based on a dielectric liquid in intimate mixture with a thermoplastic polymer material comprising a propylene homopolymer or a copolymer of propylene with at least one olefin comonomer chosen from ethylene and an α-olefin other than propylene. The dielectric liquid is an aromatic hydrocarbon comprising at least one hydrocarbon of alkylaryl type containing at least two non-fused aromatic rings (e.g. dibenzyltoluene or a mixture of 85% by mass of monoxylylene and 15% by mass of dixylylene). International patent application WO 02/03398 A1 indicates that the dielectric liquid is free of polar compounds so as to absorb a minimum amount of water and to avoid the formation of defects in the insulating layer associated with the presence of water vapour during hot extrusion. However, aromatic hydrocarbons (alkylbenzenes, alkylnaphthalenes, alkylbiphenyls, alkyldiarylethylenes) are expensive and generally entail safety and/or environmental problems (e.g. certain aromatic hydrocarbons are considered to be carcinogenic).

90 to 95% of the dielectric liquid market is covered by mineral oils on account of the low cost of these "natural" products, obtained directly by refining crude oils. The chemical composition of a mineral oil is extremely complex (several thousand different molecules) and may vary within wide proportions. The chemical composition of a mineral oil is thus generally defined by its paraffinic carbon (Cp) content, its naphthenic carbon (Cn) content and its aromatic carbon (Ca) content. Mineral oils may also contain a small percentage of hydrocarbon molecules which comprise in their structure heteroatoms such as nitrogen, sulfur or oxygen (e.g. polar compounds). The polar compound content of a mineral oil may be determined according to standard ASTM D2007-02. However, the stability to oxidation and dielectric behaviour of mineral oils are lower than those of aromatic hydrocarbons. Moreover, it is known from international patent application WO 2004/066 318 A1 that the electrical properties of a cable comprising at least one electrical conductor and at least one extruded electrically insulating layer based on a thermoplastic polymer material in intimate mixture with a mineral oil as dielectric liquid may be deteriorated by the presence of these polar compounds, especially in terms of dielectric losses.

There is thus still a need for electric cables comprising an electrically insulating layer which have electrical properties comparable to those obtained with an XLPE crosslinked layer, while at the same time ensuring good mechanical properties.

OBJECTS AND SUMMARY

Thus, the aim of the present invention is to overcome the drawbacks of the prior art and to provide an economical polymer composition comprising recyclable materials, which can give an electrically insulating layer that has improved dielectric properties, especially in terms of dielectric breakdown strength, while at the same time ensuring low dielectric losses.

The aim of the present invention is also to provide a cable, in particular a medium-voltage or high-voltage cable, which can function at temperatures above 70° C. and which has improved electrical properties, especially in terms of dielectric breakdown strength, while at the same time ensuring low dielectric losses.

These aims are achieved by the invention which will be described hereinbelow.

A first subject of the invention is a polymer composition comprising at least one propylene-based thermoplastic polymer material and a dielectric liquid, characterized in that the dielectric liquid comprises at least one mineral oil and at least one polar compound of the benzophenone type, acetophenone type or a derivative thereof.

The combination of a polar compound of the benzophenone type, acetophenone type or a derivative thereof with a mineral oil makes it possible to increase the dielectric breakdown strength of the electrically insulating layer of an electric cable while at the same time ensuring low dielectric losses. Moreover, the presence of a propylene-based thermoplastic polymer material makes it possible to increase the operating temperature of the cable to 90° C.-110° C.

The dielectric liquid may comprise at least 70% by mass approximately of mineral oil, and preferably at least 80% by mass approximately of mineral oil, relative to the total mass of the dielectric liquid.

The mineral oil is generally liquid at about 20-25° C.

The mineral oil may be chosen from naphthenic oils and paraffinic oils, and preferably from naphthenic oils.

The mineral oil is obtained from the refining of a crude oil.

According to a particularly preferred embodiment of the invention, the mineral oil comprises a paraffinic carbon (Cp) content ranging from about 45 to 65 atom %, a naphthenic carbon (Cn) content ranging from about 35 to 55 atom % and an aromatic carbon (Ca) content ranging from about 0.5 to 10 atom %.

In one particular embodiment, the polar compound of the benzophenone type, acetophenone type or a derivative thereof represents at least 2.5% by mass approximately, preferably at least 3.5% by mass approximately and even more preferentially at least 4% by mass approximately, relative to the total mass of the dielectric liquid. By virtue of this minimum amount of polar compound, the dielectric breakdown strength is improved.

The dielectric liquid may comprise not more than 30% by mass approximately, preferably not more than 20% by mass approximately and even more preferentially not more than 15% by mass approximately of polar compound of the benzophenone type, acetophenone type or a derivative thereof, relative to the total mass of the dielectric liquid. This maximum amount makes it possible to ensure moderate, or even low, dielectric losses (e.g. less than about $10^{-3}$), and also to avoid migration of the dielectric liquid out of the electrically insulating layer.

The amount of polar compounds in the dielectric liquid may be determined according to standard ASTM D2007-02.

The polar compound of the benzophenone type, acetophenone type or a derivative thereof may correspond to formula (I) below:

in which $R^1$ and $R^2$, identical or different, are aryl, alkyl or alkylene-aryl groups, the groups $R^1$ and $R^2$ possibly being linked together via the element A representing a single bond or a group —$(CH_2)_n$— with n equal to 1 or 2.

The aryl group may comprise one or more fused or non-fused, and preferably non-fused, aromatic rings.

The aryl group may comprise from 5 to 20 carbon atoms and preferably from 5 to 15 carbon atoms.

Each aromatic ring may comprise one or more heteroatoms such as a nitrogen atom, a sulfur atom or an oxygen atom.

Each aromatic ring may be substituted with one or more substituents X chosen from a halogen atom, an alkyl group and an alkoxy-O-alkyl group. An alkyl group is preferred.

The halogen atom as substituent X on an aromatic ring is preferably a chlorine or fluorine atom, and more preferably a chlorine atom.

The alkyl group as substituent X on an aromatic ring may contain from 1 to 10 carbon atoms, preferably from 1 to 5 carbon atoms and more preferably from 2 to 4 carbon atoms.

The alkyl group of the alkoxy-O-alkyl group as substituent X on an aromatic ring may contain from 1 to 10 carbon atoms, preferably from 1 to 5 carbon atoms and more preferably from 2 to 4 carbon atoms.

The aromatic ring(s) preferably do not comprise any polar protic substituents such as an —OH group, an —SH group, an —NH group or an —NH$_2$ group.

The aryl group is preferably a phenyl group, a naphthyl group or a pyridyl group, and more preferably a phenyl group.

The alkyl group as group $R^1$ and/or $R^2$ may contain from 1 to 20 carbon atoms, preferably from 1 to 10 carbon atoms and more preferably from 1 to 5 carbon atoms.

In the present invention, the alkyl group may be cyclic, linear or branched.

The alkylene-aryl group is a mixed group which comprises an aryl group as defined in the present invention and an alkylene group. The alkylene group of the alkylene-aryl group is directly connected to the ketone function of the compound of formula (I).

The alkylene group may be linear, cyclic or branched, and preferably linear.

In particular, the alkylene group may contain from 1 to 5 carbon atoms.

Preferably, the alkylene group is a group —$(CH_2)_p$— with $1 \leq p \leq 5$; a group —$(CHR)_{p1}$— with $1 \leq p_1 \leq 5$ and R being an alkyl group, preferably containing from 1 to 5 carbon atoms; a statistical group —$(CHR)_{m1}$—$(CH_2)_{m2}$— (i.e. comprising $m_1$ —$CH_2$— and $m_2$ —CHR—), with $1 \leq m_1+m_2 \leq 5$, and R being an alkyl group, preferably containing from 1 to 5 carbon atoms; or a statistical group —$(CHR)_{p2}$—$(CH_2)_{p3}$—$(CHR')_{p4}$— (i.e. comprising $p_2$ —$CH_2$—, $p_3$ —CHR— and $p_4$ —CHR'—), with $1 \leq p_2+p_3+p_4 \leq 5$, and R and R' being different alkyl groups, each preferably containing from 1 to 5 carbon atoms, preferably with $1 \leq m_1 \leq 4$, $1 \leq m_2 \leq 4$, $1 \leq p_2 \leq 3$, $1 \leq p_3 \leq 3$ and $1 \leq p_4 \leq 3$.

In the present invention, a statistical group means that the radicals which constitute it (e.g. —$CH_2$—, —CHR— and/or —CHR'—) may be randomly positioned in the alkylene group.

R (or, respectively, R') may be a methyl, ethyl, propyl or isopropyl group.

When the alkylene group is branched (e.g. presence of at least either of the groups R or R'), it may also be connected via branching to the aryl group of said alkylene-aryl group.

The alkylene-aryl group may be a benzyl group (alkylene-aryl group in which the alkylene group is a $CH_2$ and the aryl group is a phenyl).

The compound of formula (I) is of benzophenone type when the groups $R^1$ and $R^2$ are aryl groups; of acetophenone type when one of the groups $R^1$ or $R^2$ is an aryl group and the other is an alkyl group; and a derivative thereof when the groups $R^1$ and $R^2$ are alkyl groups or one of the groups $R^1$ or $R^2$ is an alkylene-aryl group and the other is an alkyl, aryl or alkylene-aryl group.

According to a first variant of the invention, at least one of said groups $R^1$ or $R^2$ of the compound of formula (I) is a phenyl group.

According to a second variant of the invention, the groups $R^1$ and $R^2$ of the compound of formula (I) are aryl groups. Preferably, at least one of them comprises a phenyl group, and more preferably the two alkyl groups each comprise a phenyl group.

According to a third variant, the groups $R^1$ and $R^2$ of the compound of formula (I) are each phenyl groups, which are preferably unsubstituted.

According to a particularly preferred embodiment of the invention, the compound of formula (I) may be benzophenone, dibenzosuberone, fluorenone or anthrone, and preferably benzophenone.

The ratio of the number of aromatic carbon atoms to the total number of carbon atoms in the dielectric liquid may be less than about 0.3; and more preferably less than about 0.2.

By virtue of this low ratio, the safety problems associated with the toxicity of the dielectric liquid are minimized.

The ratio of the number of aromatic carbon atoms to the total number of carbon atoms in the dielectric liquid may be determined according to standard ASTM D3238.

The mineral oil may comprise one or more polar compounds other than the polar compound of the benzophenone type, acetophenone type or a derivative thereof and in particular other than the compound of formula (I).

It will, however, be preferred for these polar compounds other than the polar compound of the benzophenone type, acetophenone type or a derivative thereof or other than the compound of formula (I) to represent not more than 2.5% by mass approximately, and preferably not more than 1.5% by mass approximately, relative to the total mass of the dielectric liquid.

An oil containing such proportions of polar compounds may be a refined oil.

Preferably, the dielectric liquid has a boiling point of greater than about 250° C.

Thus, the dielectric liquid of the polymer composition of the invention which combines a mineral oil and a compound of the benzophenone type, acetophenone type or a derivative thereof may be manipulated without risk at room temperature (sparingly volatile) and at the temperatures required by the process for forming the electrically insulating layer (e.g. extrusion), while at the same time ensuring the formation of a homogeneous intimate mixture with the polymer material of the polymer composition of the invention.

The polypropylene-based thermoplastic polymer material may comprise at least one homopolymer or one copolymer of propylene ($P_1$), and optionally at least one homopolymer or one copolymer of α-olefin ($P_2$).

The combination of polymers $P_1$ and $P_2$ makes it possible to obtain a thermoplastic polymer material with good mechanical properties, especially in terms of elastic modulus, and good electrical properties.

In particular, the propylene copolymer $P_1$ may be a statistical propylene copolymer.

Examples of propylene copolymers $P_1$ that may be mentioned include copolymers of propylene and of olefin, the olefin being chosen especially from ethylene and an α-olefin other than propylene.

The α-olefin other than propylene may correspond to the formula $CH_2=CH-R^3$ in which $R^3$ is a linear or branched alkyl group containing from 2 to 10 carbon atoms, chosen especially from the following olefins: 1-butene, 1-pentene; 4-methyl-1-pentene, 1-hexene, 1-octene, 1-decene, 1-dodecene, and a mixture thereof.

The olefin of the copolymer of propylene and olefin preferably represents not more than 15 mol % and more preferably not more than 10 mol % of the copolymer.

Copolymers of propylene and ethylene are preferred as propylene copolymer $P_1$.

The propylene copolymer $P_1$ preferably has an elastic modulus ranging from about 600 to 1200 MPa.

The propylene homopolymer $P_1$ preferably has an elastic modulus ranging from about 1250 to 1600 MPa.

The propylene homopolymer or copolymer $P_1$ may have a melting point of greater than about 130° C., preferably greater than about 140° C., and more preferably ranging from about 140 to 165° C.

In particular, the propylene homopolymer $P_1$ may have a melting point of about 165° C. and the propylene copolymer $P_1$ may have a melting point ranging from about 140 to 150° C.

The propylene homopolymer or copolymer $P_1$ may have a heat of fusion ranging from about 30 to 100 J/g.

In particular, the propylene homopolymer $P_1$ may have a heat of fusion ranging from about 80 to 90 J/g and the propylene copolymer $P_1$ may have a heat of fusion ranging from about 30 to 70 J/g.

The propylene homopolymer or copolymer $P_1$ may have a melt flow index ranging from 0.5 to 3 g/10 minutes, measured at about 230° C. with an approximately 2.16 kg load according to standard ASTM D1238-00.

According to a preferred embodiment of the invention, the propylene homopolymer or copolymer $P_1$ represents from about 40% to 70% by mass of the polypropylene-based thermoplastic polymer material.

The α-olefin of the α-olefin homopolymer or copolymer $P_2$ may correspond to the formula $CH_2=CH-R^4$ in which $R^4$ is a hydrogen atom or a linear or branched alkyl group containing from 1 to 12 carbon atoms, and may be chosen especially from the following olefins: ethylene, propylene, 1-butene, isobutylene, 1-pentene, 4-methyl-1-pentene, 1-hexene, 1-octene, 1-decene, 1-dodecene, and a mixture thereof.

The α-olefin propylene, 1-hexene or 1-octene is preferred.

The α-olefin homopolymer or copolymer $P_2$ may be a heterophasic copolymer comprising a thermoplastic phase of propylene type and a thermoplastic elastomer phase of the type copolymer of ethylene and of an α-olefin, a polyethylene or a mixture thereof.

The thermoplastic elastomer phase of the heterophasic copolymer may represent at least 20% by mass approximately, and preferably at least 45% by mass approximately, relative to the total mass of the heterophasic copolymer.

The α-olefin of the thermoplastic elastomer phase of the heterophasic copolymer may be propylene.

The polyethylene may be a linear low-density polyethylene. In the present invention, the term "linear low-density polyethylene" means a linear polyethylene with a density ranging from about 0.91 to 0.925.

According to a preferred embodiment of the invention, the α-olefin homopolymer or copolymer $P_2$ represents from about 30% to 60% by mass of the polypropylene-based thermoplastic polymer material.

The thermoplastic polymer material of the polymer composition of the invention is preferably heterophasic (i.e. it comprises several phases). The presence of several phases generally originates from the mixing of two different polyolefins, such as a mixture of polypropylene and of a copolymer of propylene or of polyethylene.

The polymer composition of the invention comprises a homogeneous intimate mixture of the dielectric liquid and of the thermoplastic polymer material (e.g. it forms a homogeneous phase).

The mass concentration of the dielectric liquid in the polymer composition is preferably less than or equal to the saturation mass concentration of said dielectric liquid in the thermoplastic polymer material.

The saturation mass concentration at 20-25° C. is generally from about 15% to 20%. It may be determined by the liquid absorption method. In particular, plates (e.g. 200 mm×200 mm×0.5 mm in size) made of the polypropylene-based thermoplastic polymer material of the polymer composition are prepared from the corresponding starting materials, especially by moulding. Samples of these plates are weighed (initial weight=$P_0$) and then immersed at about 20° C. into the dielectric liquid of the polymer composition. The saturation mass concentration is measured by determining the weight change (as a percentage) of the samples after various immersion times (e.g. 3, 6, 9, 12 and 15 days) and after the surface thereof has been cleaned and dried (final weight=$P_f$). The absorption of the dielectric liquid is determined according to the following formula:

% absorption of dielectric liquid=$[(P_f-P_0)/P_0]\times 100$

The saturation concentration is reached when $P_f$ shows a variation of less than 1% relative to the total weight increase which corresponds to $P_f-P_0$.

According to a particular embodiment, the dielectric liquid represents from about 1% to 20% by mass, preferably from about 2% to 15% by mass and more preferably from about 3% to 12% by mass relative to the total mass of the polymer composition.

According to a particular embodiment, the polar compound of the benzophenone type, acetophenone type or a derivative thereof represents from about 0.15% to 1.8% by mass, preferably from about 0.21% to 1.2% by mass and more preferably from about 0.24% to 0.9% by mass relative to the total mass of the polymer composition.

According to a particular embodiment, the polypropylene-based thermoplastic polymer material represents from about 70% to 98% by mass, preferably from about 80% to 95% by mass and more preferably from about 88% to 97% by mass relative to the total mass of the polymer composition.

The polymer composition may also comprise one or more additives.

The additives are well known to those skilled in the art and may be chosen from antioxidants, UV stabilizers, copper scavengers, water treeing inhibitors, pigments, and a mixture thereof.

The polymer composition of the invention may typically comprise from about 0.01% to 5% by mass and preferably from about 0.1% to 2% by mass of additives relative to the total mass of the polymer composition.

More particularly, the antioxidants protect the polymer composition against the thermal stresses generated during the steps for manufacturing the cable or during the functioning of the cable.

The antioxidants are preferably chosen from hindered phenols, thio esters, sulfur-based antioxidants, phosphorus-based antioxidants, antioxidants of amine type, and a mixture thereof.

Examples of hindered phenols that may be mentioned include pentaerythrityl tetrakis(3-(3,5-di-tert-butyl-4-hydroxyphenyl)propionate) (Irganox® 1010), octadecyl 3-(3,5-di-tert-butyl-4-hydroxyphenyl)propionate (Irganox® 1076), 1,3,5-trimethyl-2,4,6-tris(3,5-di-tert-butyl-4-hydroxybenzyl)benzene (Irganox® 1330), 4,6-bis(octylthiomethyl)-o-cresol (Irgastab® KV10), 2,2'-thiobis(6-tert-butyl-4-methylphenol) (Irganox® 1081), 2,2'-thiodiethylenebis[3-(3,5-di-tert-butyl-4-hydroxyphenyl) propionate] (Irganox® 1035), 2,2'-methylenebis(6-tert-butyl-4-methylphenol), 1,2-bis(3,5-di-tert-butyl-4-hydroxyhydrocinnamoyl)hydrazine (Irganox® MD 1024) and 2,2'-oxamidobis(ethyl 3-(3,5-di-tert-butyl-4-hydroxyphenyl) propionate).

Examples of thio esters that may be mentioned include didodecyl 3,3'-thiodipropionate (Irganox® PS800), distearyl thiodipropionate (Irganox® PS802) and 4,6-bis(octylthiomethyl)-o-cresol (Irganox® 1520).

Examples of sulfur-based antioxidants that may be mentioned include dioctadecyl 3,3'-thiodipropionate and didodecyl 3,3'-thiodipropionate.

Examples of phosphorus-based antioxidants that may be mentioned include tris(2,4-di-tert-butylphenyl) phosphite (Irgafos® 168) and bis(2,4-di-tert-butylphenyl)pentaerythrityl diphosphite (Ultranox® 626).

Examples of antioxidants of amine type that may be mentioned include phenylenediamines (e.g. 1PPD or 6PPD), diphenylaminestyrenes, diphenylamines, mercaptobenzimidazoles and polymerized 2,2,4-trimethyl-1,2 dihydroquinoline (TMQ).

An example of a mixture of antioxidants that may be mentioned is Irganox B 225, which comprises an equimolar mixture of Irgafos 168 and Irganox 1010 as described above.

The polymer composition is a thermoplastic polymer composition.

It is thus not crosslinkable.

In particular, the polymer composition does not comprise any crosslinking agents, silane-type coupling agents, peroxides and/or additives that enable crosslinking. The reason for this is that such agents degrade the polypropylene-based thermoplastic polymer material.

The polymer composition is preferably recyclable.

A second subject of the invention is a process for preparing the polymer composition in accordance with the first subject, characterized in that it comprises at least one step i) of mixing a polypropylene-based thermoplastic polymer material with a dielectric liquid as defined in the first subject of the invention.

In particular, the mixing is performed according to the following substeps:

i-a) mixing a mineral oil and at least one polar compound of the benzophenone type, acetophenone type or a derivative thereof (as defined in the first subject of the invention), so as to form a dielectric liquid as defined in the first subject of the invention, and i-b) mixing a polypropylene-based thermoplastic polymer material as defined in the first subject of the invention with the dielectric liquid as obtained in the preceding substep i-a).

The polypropylene-based thermoplastic polymer material of substep i-b) is generally in the form of polymer granules, especially of granules of at least one propylene homopolymer or copolymer $P_1$ and optionally of at least one α-olefin homopolymer or copolymer $P_2$ as defined in the first subject of the invention.

The mixing of substep i-a) may be performed using any machine that allows dissolution of the polar compound of the benzophenone type, acetophenone type or a derivative thereof and optionally of the additive(s) (especially when they are in the form of solid powders) in the mineral oil.

Substep i-a) is preferably performed at a temperature ranging from about 20 to 100° C., preferably from about 50 to 90° C. and more preferably at a temperature of about 75° C.

Substep i-a) generally lasts from 15 minutes to 1 hour and preferably from 20 to 30 minutes.

On conclusion of substep i-a), a stable, transparent solution is obtained.

The mixing of substep i-a) may also comprise the additive(s) as defined in the invention (e.g. antioxidant).

The mixing of substep i-b) may be performed by mixing the dielectric liquid obtained in substep i-a) with the polypropylene-based thermoplastic polymer material or the polymeric compounds which constitute it, especially using an internal mixer, especially with tangential rotors or with gear rotors, or a continuous mixer, especially a screw or counter-rotating twin-screw mixer or a mixer of "Buss extruder" type.

Substep i-b) may be performed by impregnating granules of a polypropylene-based thermoplastic polymer material as defined in the first subject of the invention with the dielectric liquid, in particular by mixing the polymer granules with the dielectric liquid, heating the resulting mixture so that the granules absorb the dielectric liquid, feeding a single-screw extruder with the resulting mixture and melt-homogenizing the mixture obtained by mechanical stirring in the extruder.

In the course of substep i-b), the polymer composition of the invention may be formed, especially in the form of granules.

To do this, the temperature in the mixer is chosen to be sufficient to obtain the thermoplastic polymer material in melt form. Next, the homogeneous mixture may be granulated, via techniques that are well known to those skilled in the art. These granules can then feed an extruder to manufacture the cable of the invention according to a process as defined below.

A third subject of the invention is a cable comprising at least one elongated electrically conducting element, and at least one electrically insulating layer obtained from a polymer composition as defined in the first subject of the invention.

The electrically insulating layer of the invention is a non-crosslinked layer.

The electrically insulating layer of the invention is preferably a recyclable layer.

The electrically insulating layer of the invention may be an extruded layer, in particular extruded via processes that are well known to those skilled in the art.

In the present invention, the term "electrically insulating layer" means a layer whose electrical conductivity may be not more than $1 \times 10^{-9}$ S/m and preferably not more than $1 \times 10^{-10}$ S/m (Siemens per metre) (at 25° C.).

The cable of the invention more particularly relates to the field of electric cables functioning with direct current (DC) or alternating current (AC).

The electrically insulating layer of the invention may surround the elongated electrically conducting element.

The elongated electrically conducting element may be a mono-core conductor, for instance a metal wire, or a multi-core conductor such as a plurality of optionally twisted metal wires.

The elongated electrically conducting element may be made of aluminium, of aluminium alloy, of copper, of copper alloy, and of a combination thereof.

According to a preferred embodiment of the invention, the electric cable may comprise:

a first semi-conducting layer surrounding the elongated electrically conducting element, an electrically insulating layer surrounding the first semi-conducting layer, said electrically insulating layer being as defined in the invention, and a second semi-conducting layer surrounding the electrically insulating layer.

In the present invention, the term "semi-conducting layer" means a layer whose electrical conductivity may be at least $1 \times 10^{-9}$ S/m (Siemens per metre), preferably at least $1 \times 10^{-3}$ S/m, and may preferably be less than $1 \times 10^{3}$ S/m (at 25° C.).

In a particular embodiment, the first semi-conducting layer, the electrically insulating layer and the second semi-conducting layer constitute a three-layer insulation. In other words, the electrically insulating layer is in direct physical contact with the first semi-conducting layer, and the second semi-conducting layer is in direct physical contact with the electrically insulating layer.

The cable may also comprise an electrically insulating sheath surrounding the second semi-conducting layer, and may be in direct physical contact therewith.

The electric cable may also comprise a metal shield surrounding the second semi-conducting layer. In this case, the electrically insulating sheath surrounds said metal shield.

This metal shield may be a "wire" shield composed of an assembly of copper or aluminium conductors arranged around and along the second semi-conducting layer, a "strip" shield composed of one or more conductive metal strips made of copper or aluminium optionally posed helically around the second semi-conducting layer or a conductive metal strip made of aluminium posed longitudinally around the second semi-conducting layer and rendered leaktight by means of adhesive in the overlap areas of parts of said strip, or a "leaktight" shield of metal tube type optionally composed of lead or lead alloy and surrounding the second semi-conducting layer. This last type of shield can especially act as a barrier to moisture which has a tendency to penetrate radially into the electric cable.

The metal shield of the electric cable of the invention may comprise a "wire" shield and a "leaktight" shield or a "wire" shield and a "strip" shield.

All the types of metal shields may act as earth for the electric cable and may thus transport fault currents, for example in the case of a short circuit in the network concerned.

Other layers, such as layers which swell in the presence of moisture, may be added between the second semi-conducting layer and the metal shield, these layers ensuring the longitudinal waterproofing of the electric cable.

A fourth subject of the invention is a process for manufacturing an electric cable in accordance with the third subject of the invention, characterized in that it comprises at least one step 1) of extrusion of the polymer composition in accordance with the first subject of the invention around an elongated electrically conducting element, to obtain an (extruded) electrically insulating layer surrounding said elongated electrically conducting element.

Step 1) may be performed via techniques that are well known to those skilled in the art, for example using an extruder.

During step 1), the composition leaving the extruder is said to be "non-crosslinked", the operating temperature and time in the extruder being optimized in consequence.

A layer extruded around said electrically conducting element, which may or may not be in direct physical contact with said elongated electrically conducting element, is thus obtained at the extruder outlet.

The process preferably does not comprise a step of crosslinking of the layer obtained in step 1).

DETAILED DESCRIPTION

For the sake of clarity, only the elements essential to the understanding of the invention have been represented schematically, and are not to scale.

Figure 1:
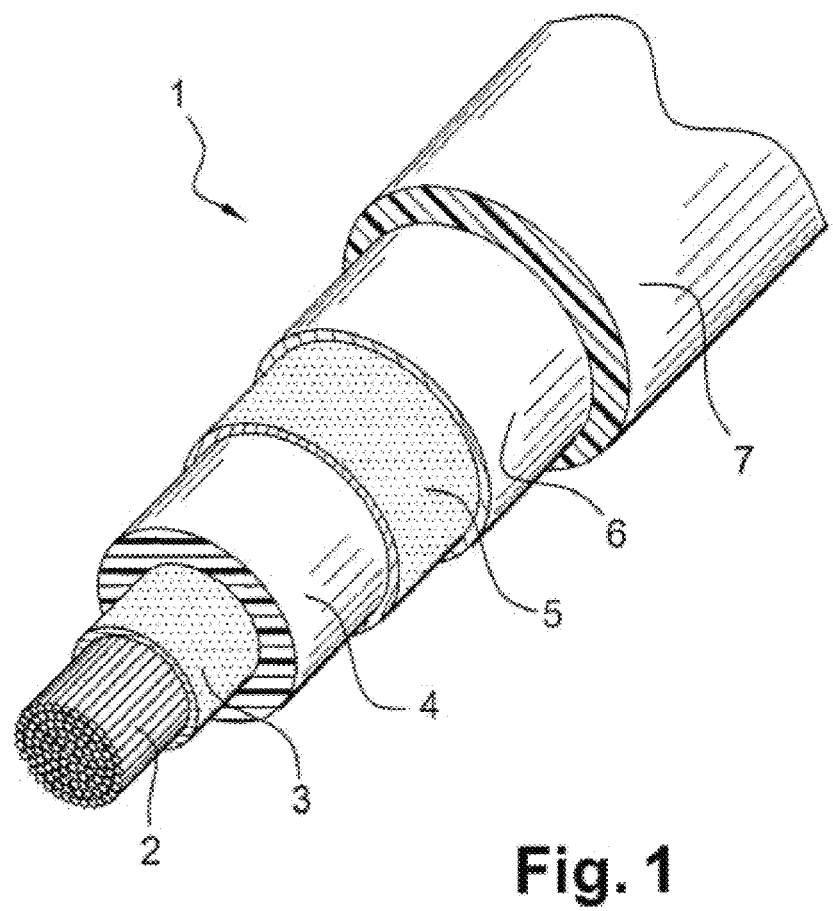
FIG. 1 is a schematic view of an electric cable according to a preferred embodiment in accordance with the invention.

The medium-voltage or high-voltage power cable 1, illustrated in FIG. 1, comprises a central elongated electrically conducting element 2, especially made of copper or aluminium. The power cable 1 also comprises several layers arranged successively and coaxially around this central elongated electrically conducting element 2, namely: a first semi-conducting layer 3 known as the "internal semi-conducting layer", an electrically insulating layer 4, a second semi-conducting layer 5 known as the "external semi-conducting layer", an earthing and/or protective metal shield 6, and a protective outer sheath 7.

The electrically insulating layer 4 is a non-crosslinked extruded layer, obtained from the polymer composition according to the invention.

The semi-conducting layers 3 and 5 are thermoplastic (i.e. non-crosslinked) extruded layers.

The presence of the metal shield 6 and of the outer protective sheath 7 is preferential, but not essential, this cable structure being well known per se to those skilled in the art.

EXAMPLES

1. Polymer Compositions

Table 1 below collates polymer compositions in which the amounts of the compounds are expressed as weight percentages relative to the total weight of the polymer composition.

Compositions C1 and C2 are comparative compositions, and compositions I1 and I2 are in accordance with the invention.

TABLE 1

| | Polymer compositions | | | |
|---|---|---|---|---|
| | C1 | C2 | I1 | I2 |
| Propylene copolymer | 100 | 100 | 100 | 100 |
| Linear low-density polyethylene | 50 | 50 | 50 | 0 |
| Heterophasic propylene copolymer | 50 | 50 | 50 | 100 |
| Mineral oil | 0 | 12 | 12 | 12 |
| Benzophenone | 0 | 0 | 0.7 | 0.7 |
| Antioxidant | 0.7 | 0.7 | 0.7 | 0.7 |

The origin of the compounds in table 1 is as follows:
statistical propylene copolymer sold by the company Borealis under the reference Bormed RB 845 MO;
linear low-density polyethylene sold by the company ExxonMobil Chemicals under the reference LLDPE LL 1002 YB;
heterophasic copolymer sold by the company Basell Polyolefins under the reference Adflex Q 200F;
mineral oil sold by the company Nynas under the reference Nytex 810, the oil comprises 10% of aromatic carbon atoms, 43% of naphthenic carbon atoms and 47% of paraffinic carbon atoms;
antioxidant sold by the company Ciba under the reference Irganox B 225, which comprises an equimolar mixture of Irgafos 168 and Irganox 1010; and
benzophenone sold by the company Sigma-Aldrich under the reference B9300.

2. Preparation of the Non-Crosslinked Layers

The compositions collated in table 1 are used as follows.

102 ml of mineral oil, 6 g of antioxidant and 6 g of benzophenone were mixed with stirring at about 75° C., so as to form a dielectric liquid.

The dielectric liquid was subsequently mixed with 850 g of propylene copolymer, 425 g of linear low-density polyethylene and 425 g of heterophasic copolymer in a container, and the resulting mixture was then homogenized using a twin-screw extruder (Berstorff twin screw extruder) at a temperature of about 145 to 180° C., and then melted at about 200° C. (screw speed: 80 rpm).

The molten homogenized mixture was then formed into granules.

Cables were manufactured with a laboratory extruder and subjected to electrical characterizations. Each of the cables comprised:
an electrically conducting element with a cross section of 1.4 mm,
a first semi-conducting layer surrounding said electrically conducting element,
an electrically insulating layer obtained from the polymer composition of the invention or from a comparative polymer composition surrounding said first semi-conducting layer, and
a second semi-conducting layer surrounding said electrically insulating layer.

The cables had a total outside diameter of about 6.1 mm and a total length of about 3.64 m. They were stripped of the second semi-conducting layer over a thickness of 150 μm and a length of 87 cm.

The electrically insulating layer had a thickness of 1.5 mm (internal and external radius of 1.4 mm and 2.9 mm, respectively).

The semi-conducting layers were thermoplastic layers having the following composition: 48% by mass of statistical propylene copolymer (Bormed RB 845 MO); 20% by mass of a heterophasic copolymer (Adflex Q 200F); 25% by mass of carbon black (Vulcan XC 500); 6.5% by mass of a mineral oil (Nytex 810) and 0.5% by mass of antioxidant.

3. Characterization of the Non-Crosslinked Layers

The dielectric breakdown strength of the layers was measured by applying on the electrically conducting element of the cable a 50 Hz AC voltage ramp of 2 kV/s. The second semi-conducting layer was connected to the earth. The two ends were immersed in distilled water.

Statistical analysis (Weibull model) was performed on 10 experimental values of dielectric breakdown strength obtained.

The tangent delta (tan δ) (or loss factor) at 25° C., 90° C. and 130° C. of the layers as prepared above was measured by dielectric spectroscopy using a machine sold under the trade name Alpha-A by the company Novocontrol Technologies.

The tangent of the loss angle gives an indication regarding the energy dissipated in a dielectric in the form of heat.

The tests were performed on samples with a thickness close to 0.5 mm, over a frequency range from 40 to 60 Hz with a 500 V voltage adapted according to the thickness of the test sample, so as to apply an electric field of 1 kV/mm. A temperature of 25° C., 90° C. or 130° C. was applied during the various tests.

Stress whitening resistance tests were also performed by subjecting samples with a thickness close to 1 mm to a mechanical test such as a test of curvature of the sample at room temperature with a radius of curvature of 5 mm.

4. Results

The tangent delta results obtained are collated in FIGS. 2A (layer obtained from composition C1) and 2B (layer obtained from composition I1).

Figure 2:
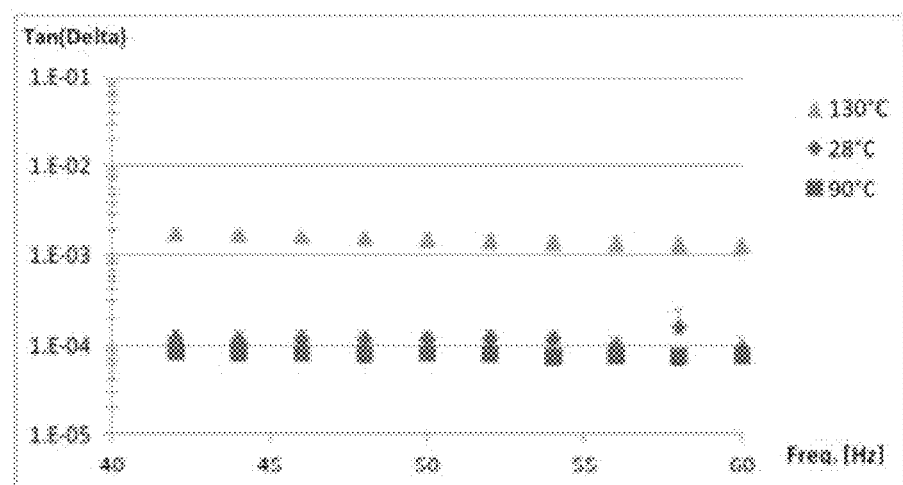
FIG. 2 shows the curves of the tangent delta (tan($\delta$)) at 90° C. as a function of the frequency (Hz), for a layer according to the invention and for a comparative layer.
Figure 2:
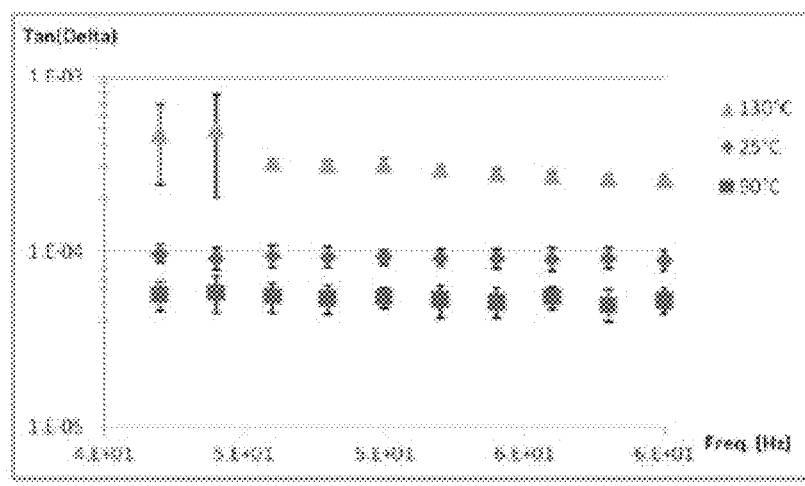

FIG. 2 shows the tangent delta (tan(δ)) (or tangent of the loss angle) at 25° C. (curves with filled diamonds), at 90° C. (curves with filled squares) and at 130° C. (curves with filled triangles) as a function of the frequency (Hz), for the comparative non-crosslinked layer (FIG. 2A) and for the non-crosslinked layer according to the invention (FIG. 2B).

It is clearly seen that the layer obtained from composition I1 according to the invention has dielectric losses that are very slightly higher than those obtained with the comparative composition C1, especially at 130° C., but which remain very acceptable.

The results at 50 Hz are collated in table 2 below:

TABLE 2

|  | Compositions | | |
| --- | --- | --- | --- |
|  | C1 | C2 | I1 |
| Tangent delta at 25° C. | $1.2 \times 10^{-4}$ | $9.4 \times 10^{-5}$ | $1.2 \times 10^{-4}$ |
| Tangent delta at 90° C. | $7.5 \times 10^{-5}$ | $5.41 \times 10^{-5}$ | $8.2 \times 10^{-5}$ |
| Laboratory cable Dielectric breakdown strength (kV/mm) | 103 | 112 | 137 |

Table 2 shows that the polymer compositions according to the invention have better dielectric properties (i.e. better electrical insulation). In particular, the dielectric breakdown strength of the layer I1 of the invention is improved, relative to that of the comparative compositions C1 and C2.

The layer obtained from composition I1 moreover showed no stress whitening, whereas the layer obtained from the comparative composition C1 was revealed to be sparingly resistant since a white mark appeared immediately at the bend in to the manual stress applied.

The invention claimed is:

1. Cable comprising at least one elongated electrically conducting element, and at least one electrically insulating layer obtained from a polymer composition, wherein said electrically insulating layer is a non-crosslinked layer, and
   wherein said polymer composition includes at least one polypropylene-based thermoplastic polymer material and a dielectric liquid, and wherein the dielectric liquid comprises at least one mineral oil and at least one polar compound selected from benzophenone, acetophenone, a derivative of benzophenone, and a derivative of acetophenone.

2. The cable according to claim 1, wherein the dielectric liquid comprises at least 70% by mass of mineral oil, relative to the total mass of the dielectric liquid.

3. The cable according to claim 1, wherein the mineral oil is chosen from naphthenic oils and paraffinic oils.

4. The cable according to claim 1, wherein the polar compound represents at least 2.5% by mass relative to the total mass of the dielectric liquid.

5. The cable according to claim 1, wherein the polar compound corresponds to formula (I) below:

in which $R^1$ and $R^2$, identical or different, are aryl, alkyl or alkylene-aryl groups, the groups $R^1$ and $R^2$ possibly being linked together via the element A representing a single bond or a group —$(CH_2)_n$— with n equal to 1 or 2.

6. The cable according to claim 5, wherein the compound of formula (I) is benzophenone, dibenzosuberone, fluorenone or anthrone.

7. The cable according to claim 1, wherein the ratio of the number of aromatic carbon atoms to the total number of carbon atoms in the dielectric liquid is less than 0.3.

8. The cable according to claim 1, wherein the dielectric liquid represents from 1% to 20% by mass relative to the total mass of the polymer composition.

9. The cable according to claim 1, wherein the polypropylene-based thermoplastic polymer material comprises at least one homopolymer or one copolymer of propylene $P_1$, and at least one homopolymer or one copolymer of α-olefin $P_2$.

10. The cable according to claim 9, wherein the propylene copolymer $P_1$ is a copolymer of propylene and ethylene.

11. The cable according to claim 9, wherein the propylene homopolymer or copolymer $P_1$ represents from 40% to 70% by mass of the polypropylene-based thermoplastic polymer material.

12. The cable according to claim 9, wherein the α-olefin homopolymer or copolymer $P_2$ is a heterophasic copolymer comprising a thermoplastic phase of propylene and a thermoplastic elastomer phase of the copolymer of ethylene and of an α-olefin, a polyethylene or a mixture thereof.

13. The cable according to claim 9, wherein the α-olefin homopolymer or copolymer $P_2$ represents from 30% to 60% by mass of the polypropylene-based thermoplastic polymer material.

14. The cable according to claim 1, wherein the polymer composition also comprise one or more additives chosen in the group consisting of antioxidants, UV stabilizers, copper scavengers, water treeing inhibitors, pigments, and a mixture thereof.

15. The cable according to claim 1, wherein the polypropylene-based thermoplastic polymer material represents from 70% to 98% by mass, relative to the total mass of the polymer composition.

16. Cable comprising at least one elongated electrically conducting element, and at least one electrically insulating layer obtained from a polymer composition wherein said electrically insulating layer is a non-crosslinked layer, and
   wherein said polymer composition includes at least one polypropylene-based thermoplastic polymer material and a dielectric liquid, and
   wherein the dielectric liquid comprises at least 70% by mass of mineral oil, relative to the total mass of the dielectric liquid, and at least 2.5% by mass of a polar compound selected from benzophenone, acetophenone, a derivative of benzophenone, and a derivative of acetophenone, relative to the total mass of the dielectric liquid.

* * * * *